Feb. 18, 1969  H. L. LORENTZEN  3,428,515
STRUCTURAL BOARD HAVING OPEN CELLS EXTENDING AT
AN ANGLE TO THE SURFACES OF THE BOARD
Filed May 23, 1961

United States Patent Office 3,428,515
Patented Feb. 18, 1969

3,428,515
STRUCTURAL BOARD HAVING OPEN CELLS EXTENDING AT AN ANGLE TO THE SURFACES OF THE BOARD
Hans Ludvig Lorentzen, Oslo, Norway
(Leidsegracht 58, Amsterdam, Netherlands)
Filed May 23, 1961, Ser. No. 112,056
Claims priority, application Norway, May 27, 1960, 136,101
U.S. Cl. 161—68          4 Claims
Int. Cl. B32b 3/12

The present invention relates to a method for the manufacture of a structural board of the known type which is constituted by cells, each of which has a free cross sectional area of about the same shape as that of a honeycomb cell, the axis of each such cell being at an angle, preferably of about 90° to the surfaces of the board, by strip like joining of sheet formed webs of fibrous material, subdivision of the unit so prepared along planes at right angles to the plane of the sheet formed webs and expansion of the slice so formed in a direction parallel to the said subdivision planes. Such boards are known as honeycomb boards and are often covered with a sheet of material which closes the individual cells. Such covering may be applied at either or both ends of the cells. Boards of this type have light weight, they have a very great mechanical strength in the direction of the cell axis, they may be curved in mutually prependicular directions and they have a very high insulating strength against heat transfer between the two surfaces of the board.

In the manufacture of such previously known boards of this type sheet formed webs, consisting of natural or synthetic fibers, such as paper or glass fiber webs, are impregnated with a hardening plastic or they are provided with strip formed coatings of adhesive prior to the assembly of the webs, whereupon the joining is performed under application of heat and/or pressure. This manner of manufacture involves great difficulties, in particular when performed at an industrial scale, due to the fact that it is very difficult to obtain sufficient exact and solid joining when adhesives are used and also to ensure that the joining is restricted to the strip formed areas when plastic is used. The use of plastic impregnated webs also involves the difficulty that a certain time period elapses betwen the impregnation and the application of the presure and/or heat required for achieving the joining.

The present invention is directed to a method wherein such difficulties are avoided and which, as a consequence thereof, provides a product which is not suffering from the deficiencies of the previously known boards of the type in question. In the method of the invention, the essential feature consists in that the sheet formed webs of fibrous material are simultaneously impregnated with a hardening plastic and joined along spaced strip formed areas. In order hereby to insure that the joining is restricted to the predetermined strip formed areas, a further feature of the invention resides therein that a preferably coiled foil material having its coil axis parallel to and positioned between two adjacent joint strip areas is inserted between at least some of the pairs of material webs during their strip formed joining. Such foils may be constituted of any suitable materıal such as paper or metal or they may be plastic material foils. Such inserted coiled foils will effectively increase the face strength of the finished board, but if desired the foil coils may be removed upon expansion of the unit.

Obviously, the insertion of the coiled foils will increase the spacing of the pair of sheet formed webs which are assembled, and it may therefore be suitable to place at least one string of fibrous material in the strip formed joints, the direction of length of such string or strings being essentially parallel to the direction of length of the joint strip in question. In this manner it is not only obtained that the spacing referred to between the webs is filled up, but also and in particular an improved joining, since the fibrous string will be impregnated and add to the strength of the joint.

In the practical performance of the method according to the invention, it may be advantageous to perform the joining of the individual material webs, together with the possible insertion of inlays, continuously on a rotating drum, whereupon tthe tube-like body thus obtained is subdivided along radial planes and each such slice expanded and, if desired, provided with a covering layer. In this manner continuous webs of material, rolls or rods may be used in the production, the material being fed from store rolls and the individual liquid or powder formed materials may be supplied by means of spraying devices.

The invention also comprises boards produced according to the method of the invention, in the various variants of the same.

The invention will now be described with reference to the enclosed drawings which schematically illustrate the various steps performed during the process. In the drawings wherein the individual parts incorporated in the board are drawn greatly out of scale for the purpose of illustration:

Figure 1:
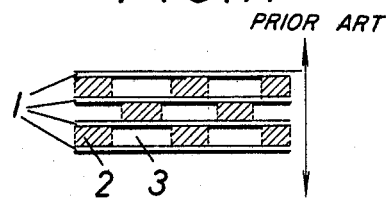
FIGURE 1 is a sectional view of a part of a stack of webs, as present in the first step of the production according to the previously known method.

In FIGURE 1 a number of webs 1 of impregnated glass fibers are stacked and assembled together by means of strip formed inlays 2 made of a polyester solution in such a manner that hollow spaces 3 are formed between the pairs of sheets 1. By applying a stretching force in the directions of the arrows, a body having the structure of a honeycomb is obtained.

Figure 2:
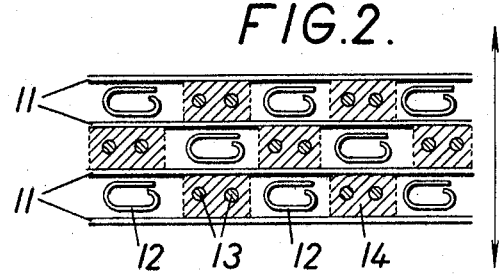
FIGURE 2 is a corresponding sectional view, in the first step of the method of the invention.

FIGURE 2 illustrates the corresponding step during the performance of the method according to the invention. In this instance, sheets 11 made of glass fiber fabric are stacked with the interlaying of spaced strips 12 each constituted by a suitable, preferably coiled foil, such as an aluminum foil, alternated with a suitable number, for instance two, of yarns or strings 13 made of glass fibers which may be untwisted or loosely twisted. By now simultaneously impregnating this stack with a hardening plastic, such as a polyester solution, possibly accompanied by the application of pressure and/or heat, the sheets 11 are joined along the strip-like areas indicated at 14, while the strips 12 prevent a continuous joining of the sheets. The yarns 13 will become enclosed in the connecting portions and are thereby also clamped in position.

Figure 3:
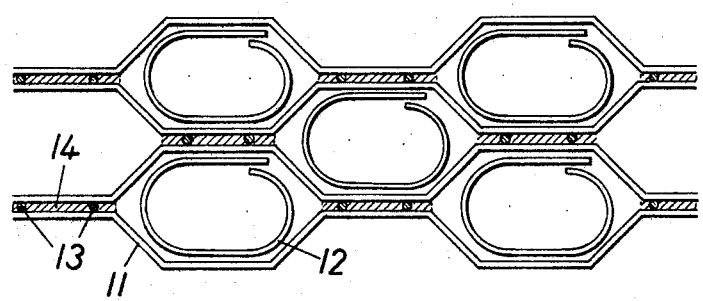
FIGURE 3 illustrates the final step of the production when performed according to the invention.

By applying stretching forces to the body so formed, in the directions of the arrows shown in FIGURE 2, a structure as shown in FIGURE 3 is obtained with substantially the configuration of a honeycomb. The manner of expanding the body of FIG. 2 to obtain the honeycomb configuration shown in FIG. 3 is well known in the art and does not form a part of the present invention. U.S. Patent 2,674,295 is exemplary of methods and means for expanding cellular material. According to the number of sheets 11 stacked together, the structure obtained will present any desired extension in a direction parallel to the plane of the drawing. The thickness of such a structure is determined by slicing the unit shown in FIGURE 2 parallel to the plane of the drawing, preferably prior to the expansion of the body. The structure shown in FIGURE 3 may be provided with a covering layer parallel to the plane of the drawing to either or both sides, to the effect that a board is obtained wherein the honeycomb cells are covered at either or both ends, according to the ultimate use of the board.

Such a board will present a very high compressive strength in the direction of the cell axes, and it is also flexible and twistable so as easily to lend itself to the various possible conditions of its ultimate use.

FIGURE 3 shows the use of expanded foil coils 12 in all cells, but it is also possible, by a suitable choice of impregnating material and foil material to provide a substantially weak bond between the foils and the sheets withdraw the foils 12 from the cells or to dissolve the same when the body is expanded, so as to leave some or all of the cells without inserted coiled foils.

In any case, irrespective of the withdrawal or not of the foils 12, the cells may be filled, upon expansion, with a liquid plastic which upon hardening forms a foam. Such filling is in particular advantageous when the structure is to be covered at either or both sides with a covering layer, as the plastic in the cells will greatly aid in keeping the covering layer or layers in position by the cementing performed for the purpose of positioning the same.

Figure 4:
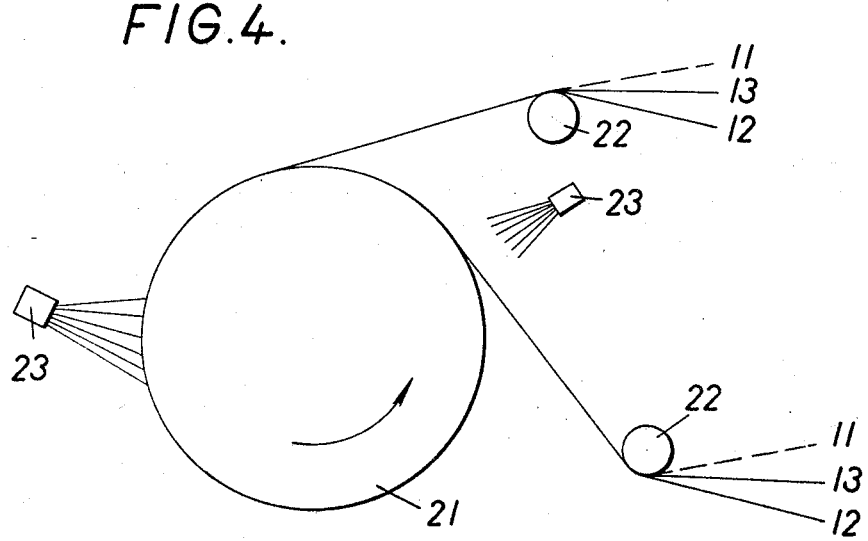
FIGURE 4 is a sectional view of an arrangtment which may be used when performing the method according to the invention.

The method of production schematically illustrated by means of FIGURE 2 may be performed on a flat base, manually or mechanically. When performing the method on an industrial scale, it may, however, be suitable to make use of an arrangement of the type schematically illustrated in FIG. 4 to produce the body shown in FIG. 2. FIG. 4 is a view taken axially with respect to a winding drum 21, the diameter of which depends on the dimensions desired in the body shown in FIGURE 2.

The rotating support formed by the drum 21 is supplied with a number of sheets 11 of glass fiber fabrics, coiled foils 12 and glass fiber yarns 13 fed by a corresponding number of feed rolls 22, such materials being sprayed with impregnating and adhesive agents through nozzles 23 during the winding action, to the effect that the body so produced is ready for hardening on the drum 21 when the desired number of turns are wound onto the same. In the figure only two sets of rollers 22 and nozzles 23 are shown, but obviously the number of such means depends upon the dimensions of the drum 21.

Instead of supplying a ready made glass fiber fabric 11 it is, in this arrangement, possible to omit the ready made sheet and instead spray glass fibers, plastic and a catalyst individually or together by means of such a nozzle as indicated at 23 in FIGURE 4, leaving the rollers 22 to feed merely the foils 12 and yarns 13. In this manner the production is substantially simplified and more economical, as no sheet formed material has to be provided and stored prior to the manufacture proper of the body according to the invention.

As mentioned, the thickness of the body formed on the drum 21, i.e., the number of layers in this body, depends on the size of the honeycomb board which is to be produced. Upon hardening of this body, preferably on the drum 21, the body may be removed from the drum 21, sliced into parallel pieces with a width corresponding to the length of the honeycomb cells and thus the thickness desired in the finished board and then subjected to expansion and provided with a covering layer or layers as described above. Due to the curved form of the surface of the drum 21, the axis of each individual honeycomb cell will also extend along a slightly curved line, a fact which is of favourable effect to the elastic qualities of the expanded honeycomb material.

Boards manufactured in accordance with the method of the invention, having mutually parallel, separated cells the axes of which extend more or less perpendicular to the expanded surfaces of the boards, may be used for a great number of different purposes in applications where a light weight structural member is needed having high mechanical strength or high heat insulating characteristic, or a combination of such qualities.

What is claimed is:

1. A structural board constituted by open cells, said board comprising sheet-like webs of fibrous material, a plastic material impregnating the webs of fibrous material in addition to constituting spaced strip-like elements between and connecting said webs, and webs and strip-like elements defining said open cells each of which has a free cross-sectional area of about the same shape as that of a honeycomb cell, the axis of each cell extending at an angle to the surfaces of the board, and a coiled foil in at least some of the cells, said foils each having a coil axis substantially coaxial with the associated cell.

2. A structural board as claimed in claim 1, wherein each strip-like element comprises at least one longitudinally disposed string of fibrous material.

3. A structural board as claimed in claim 1, comprising in at least some of the cells, a foam plastic.

4. A board as claimed in claim 1, wherein said angle is about 90°.

References Cited

UNITED STATES PATENTS

| 765,412 | 7/1904 | Budwig. | |
|---|---|---|---|
| 2,083,165 | 6/1937 | Harrap | 50—536 |
| 2,428,979 | 10/1947 | May. | |
| 2,744,042 | 5/1956 | Pace | 154—68 |
| 2,674,295 | 4/1954 | Steele et al. | 156—443 |
| 2,983,636 | 5/1961 | Runton | 161—137 |

FOREIGN PATENTS

| 68,044 | 10/1957 | France. |
|---|---|---|
| 794,217 | 4/1958 | Great Britain. |
| 802,186 | 2/1951 | Germany. |

JACOB H. STEINBERG, *Primary Examiner.*

R. J. ROCHE, *Assistant Examiner.*

U.S. Cl. X.R.

161—127, 137, 69; 156—197